United States Patent
Nishida

(10) Patent No.: US 10,473,082 B2
(45) Date of Patent: Nov. 12, 2019

(54) MOTORCYCLE

(71) Applicant: YAMAHA HATSUDOKI KABUSHIKI KAISHA, Iwata-shi, Shizuoka (JP)

(72) Inventor: Kenji Nishida, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 0 days.

(21) Appl. No.: 15/378,087

(22) Filed: Dec. 14, 2016

(65) Prior Publication Data

US 2017/0198674 A1  Jul. 13, 2017

(30) Foreign Application Priority Data

Jan. 13, 2016 (JP) ................... 2016-004159

(51) Int. Cl.
| | |
|---|---|
| F02N 11/08 | (2006.01) |
| F02B 61/02 | (2006.01) |
| F16H 1/20 | (2006.01) |
| F16H 35/10 | (2006.01) |
| F02N 15/02 | (2006.01) |
| F02N 15/00 | (2006.01) |
| F02N 11/00 | (2006.01) |

(52) U.S. Cl.
CPC .......... *F02N 11/0851* (2013.01); *F02B 61/02* (2013.01); *F02N 15/006* (2013.01); *F02N 15/023* (2013.01); *F16H 1/20* (2013.01); *F16H 35/10* (2013.01); *F02N 11/00* (2013.01); *F02N 15/02* (2013.01); *F02N 2200/042* (2013.01)

(58) Field of Classification Search
CPC ............... F02N 11/0851; F02N 15/023; F02N 2200/042; F16H 1/20; F16H 35/10; F02B 61/02

See application file for complete search history.

(56) References Cited

U.S. PATENT DOCUMENTS

| | | | |
|---|---|---|---|
| 7,051,824 B1 * | 5/2006 | Jones | F02B 33/34 123/559.1 |
| 7,530,417 B2 * | 5/2009 | Domergue | B62J 35/00 180/219 |
| 7,549,493 B1 * | 6/2009 | Jones | F02B 33/00 123/559.1 |
| 8,857,552 B2 * | 10/2014 | Oltmans | B62J 31/00 180/219 |
| 2010/0243366 A1 | 9/2010 | Mori et al. | |
| 2014/0288791 A1 * | 9/2014 | Iizuka | B60W 10/06 701/54 |

(Continued)

FOREIGN PATENT DOCUMENTS

JP     2010-228737 A     10/2010

*Primary Examiner* — Xiao En Mo

(74) *Attorney, Agent, or Firm* — Keating and Bennett, LLP

(57) ABSTRACT

A motorcycle includes a first gear provided on a crankshaft, a second gear provided on a second clutch member of a clutch that meshes with the first gear, a starter motor located above the crankcase and rearward of the cylinder body, and a link gear that links together the second gear and the starter motor. The starter motor is located above a transmission. The starter motor includes an overlapping portion that overlaps with the clutch, as the vehicle is seen from the side, and a front portion located forward of a center axis of a main shaft, as the vehicle is seen from the side.

10 Claims, 7 Drawing Sheets

(56) References Cited

U.S. PATENT DOCUMENTS

2014/0366686 A1* 12/2014 Ikemori ............... F02N 15/046
                                                    74/7 E
2015/0114364 A1*  4/2015 Matsuda ............... F02B 39/12
                                                    123/559.1
2015/0184585 A1*  7/2015 Naruoka ............... F02B 33/40
                                                    123/559.1

* cited by examiner

MOTORCYCLE

CROSS REFERENCE TO RELATED APPLICATIONS

The present application claims priority based on Japanese Patent Application No. 2016-004159, filed on Jan. 13, 2016, the disclosure of which is hereby incorporated herein by reference in its entirety.

BACKGROUND OF THE INVENTION

1. Field of the Invention

The present invention relates to a motorcycle including a starter motor.

2. Description of the Related Art

There has been a demand for mass centralization of off-road motorcycles, etc. Mass centralization is a term referring to placing heavy elements near the center of gravity of the vehicle body. It is possible, by mass centralization, to improve the maneuverability of a motorcycle, for example.

A known technique for mass centralization is to arrange the cylinder body of the engine so that the cylinder body extends upward while being inclined rearward (see, for example, Japanese Laid-Open Patent Publication No. 2010-228737). With off-road motorcycles, or the like, there is recently a demand to use starter motors capable of electrically starting the engine, such that a user can more easily start the engine than kick starting. Therefore, one may consider providing a starter motor in an off-road motorcycle, or the like, including an engine in which the cylinder body extends upward while being inclined rearward.

SUMMARY OF THE INVENTION

To achieve mass centralization of a motorcycle, and to prevent a starter motor from contacting the ground while running and to prevent the starter motor from being hit by stones or the like from the ground, it is preferred that the starter motor is located at a position that is above the crankcase of the engine and rearward of the cylinder body (particularly, at a position in the vicinity of the intersection between the crankcase and the cylinder body, as the vehicle is seen from the side). In view of this, the present inventors attempted to place a starter motor at such a position as described above. However, the present inventors discovered the following problem when attempting to place a starter motor at such a position as described above in a motorcycle including a main shaft located parallel or substantially parallel to the crankshaft, a clutch provided at one end of the main shaft in the vehicle width direction, and a generator provided at the other end of the crankshaft in the vehicle width direction, for example.

That is, with conventional techniques, a starting gear linked to the starter motor is provided at a position along the main shaft that is closer to the center in the vehicle width direction than the clutch or is provided at a position along the crankshaft that is closer to the center in the vehicle width direction than the generator. However, in order to provide the starting gear at a position along the main shaft that is closer to the center in the vehicle width direction than the clutch, there is needed a space on the main shaft for the starting gear, thus increasing the dimension of the main shaft in the axial direction. Therefore, the clutch protrudes in the vehicle width direction, and the power unit is large. On the other hand, in order to provide the starting gear at a position along the crankshaft that is closer to the center in the vehicle width direction than the generator, there is needed a space on the crankshaft for the starting gear, thus increasing the dimension of the crankshaft in the axial direction. Therefore, the generator protrudes in the vehicle width direction, and the power unit is large.

Moreover, since the rear wall of the cylinder body extends in an upward-rearward diagonal direction, the exhaust pipe attached to the rear wall extends in a downward-rearward diagonal direction. If an exhaust pipe extending in a downward-rearward diagonal direction is located above the crankcase of the engine and rearward of the cylinder body, it will be more difficult to place the starter motor at such a position as described above.

Moreover, a starter motor tends to have a greater dimension in the vehicle width direction than a kick start mechanism. Therefore, it is difficult to place a starter motor in a limited space above the crankcase of the engine and rearward of the cylinder body. It has been believed that a starter motor needs to be installed at a position that is sufficiently remote from the exhaust pipe in order to avoid interference between the exhaust pipe extending rearward from the cylinder head and the starter motor. However, if the starter motor is installed at a position sufficiently remote from the exhaust pipe, it will be necessary to increase the size of the power unit as a whole including the engine and the starter motor.

Preferred embodiments of the present invention, which have been made in view of such problems, and provide a motorcycle including a power unit, the power unit including an engine of which the cylinder body extends in an upward-rearward diagonal direction and a starter motor, wherein it is possible to achieve mass centralization and prevent the power unit from becoming large.

A motorcycle according to a preferred embodiment of the present invention includes a crankcase; a crankshaft accommodated in the crankcase and extending in a vehicle width direction; a main shaft accommodated in the crankcase, extending in the vehicle width direction, and located rearward of the crankshaft; and a clutch. The clutch includes a first clutch member supported on the main shaft and that rotates together with the main shaft, and a second clutch member supported on the main shaft and that is rotatable relative to the main shaft. The motorcycle includes a first gear provided on the crankshaft; a second gear provided on the second clutch member and that meshes with the first gear; a transmission including a plurality of transmission gears provided on the main shaft, diameters of the transmission gears being smaller than a diameter of either the first clutch member or the second clutch member; a cylinder body attached to the crankcase and extending in an upward-rearward diagonal direction from the crankcase; a cylinder head attached to the cylinder body and including a rear wall with an exhaust pipe connection port in the rear wall; an exhaust pipe connected to the exhaust pipe connection port of the cylinder head, the exhaust pipe including an upstream portion extending in a downward-rearward diagonal direction; a starter motor located above the crankcase and rearward of the cylinder body; and one or two or more link gears that link together the second gear and the starter motor. The starter motor is located above the transmission. The starter motor includes an overlapping portion that overlaps with the clutch, as the vehicle is seen from the side, and a front portion located forward of a center axis of the main shaft, as the vehicle is seen from the side.

With the motorcycle described above, the starter motor is linked to the second gear provided on the second clutch member via the link gear or link gears. Therefore, there is no need to provide the main shaft with a starting gear linked to the starter motor separately from the second clutch member. There is also no need to provide the crankshaft with a starting gear linked to the starter motor separately from the first gear. Therefore, it is possible to locate the starter motor at a position above the crankcase and rearward of the cylinder body while preventing an increase in the dimension in the axial direction of the main shaft, and it is possible to prevent an increase in the dimension in the axial direction of the crankshaft. With the motorcycle described above, it is possible to prevent an increase in size of the power unit.

The diameters of the transmission gears of the transmission are smaller than the diameters of the first clutch member and the second clutch member of the clutch, and there is more spare space above the transmission than there is above the clutch. With the motorcycle described above, since the starter motor is located above the transmission, the starter motor is able to be located above the crankcase and rearward of the cylinder body without interfering with the exhaust pipe. The starter motor does not need to be installed at a position far away from the exhaust pipe. With the motorcycle described above, the starter motor is located in the vicinity of the intersection between the crankcase and the cylinder body such that the starter motor includes the overlapping portion overlapping with the clutch and the front portion located forward of the center axis of the main shaft, as the vehicle is seen from the side. Thus, it is possible to prevent an increase in size of the power unit. As the starter motor is successfully located in the vicinity of the intersection, it is possible to achieve mass centralization.

As described above, with the motorcycle described above, it is possible to achieve mass centralization and prevent an increase in size of the power unit.

According to a preferred embodiment of the present invention, the link gear includes a one-way clutch that transmits power from the starter motor to the second gear and that cuts off power from the second gear to the starter motor.

According to the above preferred embodiment, it is possible to prevent an excessive torque from being input to the starter motor, thus protecting the starter motor, while achieving mass centralization and preventing an increase in size of the power unit.

According to another preferred embodiment of the present invention, a center of the one-way clutch is located rearward and downward of a center of the starter motor, as the vehicle is seen from the side.

According to the above preferred embodiment, even with the provision of the one-way clutch, it is possible to prevent an increase in size of the power unit in the vehicle up-down direction. Therefore, it is possible to achieve mass centralization and better prevent an increase in size of the power unit.

According to another preferred embodiment of the present invention, the link gear includes a torque limiter.

According to the above preferred embodiment, it is possible to prevent an excessive torque from being input to the starter motor, thus protecting the starter motor.

According to another preferred embodiment of the present invention, a center of the torque limiter is located rearward of a center of the starter motor and located forward and above a center of the one-way clutch, as the vehicle is seen from the side.

According to the above preferred embodiment, even with the provision of the torque limiter, it is possible to prevent an increase in size of the power unit. Therefore, it is possible to achieve mass centralization and better prevent an increase in size of the power unit.

According to another preferred embodiment of the present invention, the starter motor meshes with the torque limiter; the torque limiter meshes with the one-way clutch via a first idler gear; and the one-way clutch meshes with the second gear via a second idler gear.

According to the above preferred embodiment, it is possible to achieve a desirable motorcycle, with which it is possible to achieve mass centralization and prevent an increase in size of the power unit.

According to another preferred embodiment of the present invention, the main shaft includes a first end and a second end. The first clutch member and the second clutch member are supported on the first end of the main shaft. The motorcycle further includes a clutch release lever attached to the second end of the main shaft and used to operate the clutch. The link gear is located on the same side of a center line of the cylinder body as the first end of the main shaft.

According to the above preferred embodiment, it is possible to prevent interference between the starter motor and the clutch release lever and prevent an increase in size of the power unit. It is possible to install the starter motor at such a position as described above without increasing the size of the power unit.

According to another preferred embodiment of the present invention, the starter motor extends across a vertical plane that includes a center line of the cylinder body.

According to the above preferred embodiment, as the starter motor is located relatively close to the center, it is possible to reduce a protruding amount of the power unit in the vehicle width direction and prevent an increase in size of the power unit. Therefore, it is possible to achieve mass centralization and better prevent an increase in size of the power unit.

According to another preferred embodiment of the present invention, the exhaust pipe includes a rear portion located rearward of the cylinder head, a left portion located leftward of the cylinder head, a front portion located forward of the cylinder head, and a right portion located rightward of the cylinder head, as the vehicle is seen from above.

Even when the exhaust pipe extends along the entire circumference of the cylinder head, as the vehicle is seen from above, as in the above preferred embodiment, it is possible to avoid interference between the exhaust pipe and the starter motor, thus preventing an increase in size of the power unit. It is possible to achieve a compact arrangement of the exhaust pipe while ensuring a sufficient length of the exhaust pipe. Therefore, it is possible to achieve mass centralization and prevent an increase in size of the power unit.

According to another preferred embodiment of the present invention, the cylinder body includes a single cylinder.

For a motorcycle including a single-cylinder engine, as compared with a motorcycle including a multi-cylinder engine, there is a stronger demand to prevent an increase in size of the power unit because of the provision of the starter motor. According to the above preferred embodiment, the advantageous effect of preventing an increase in size of the power unit while achieving mass centralization is more pronounced.

prevent an increase in size of the power unit The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
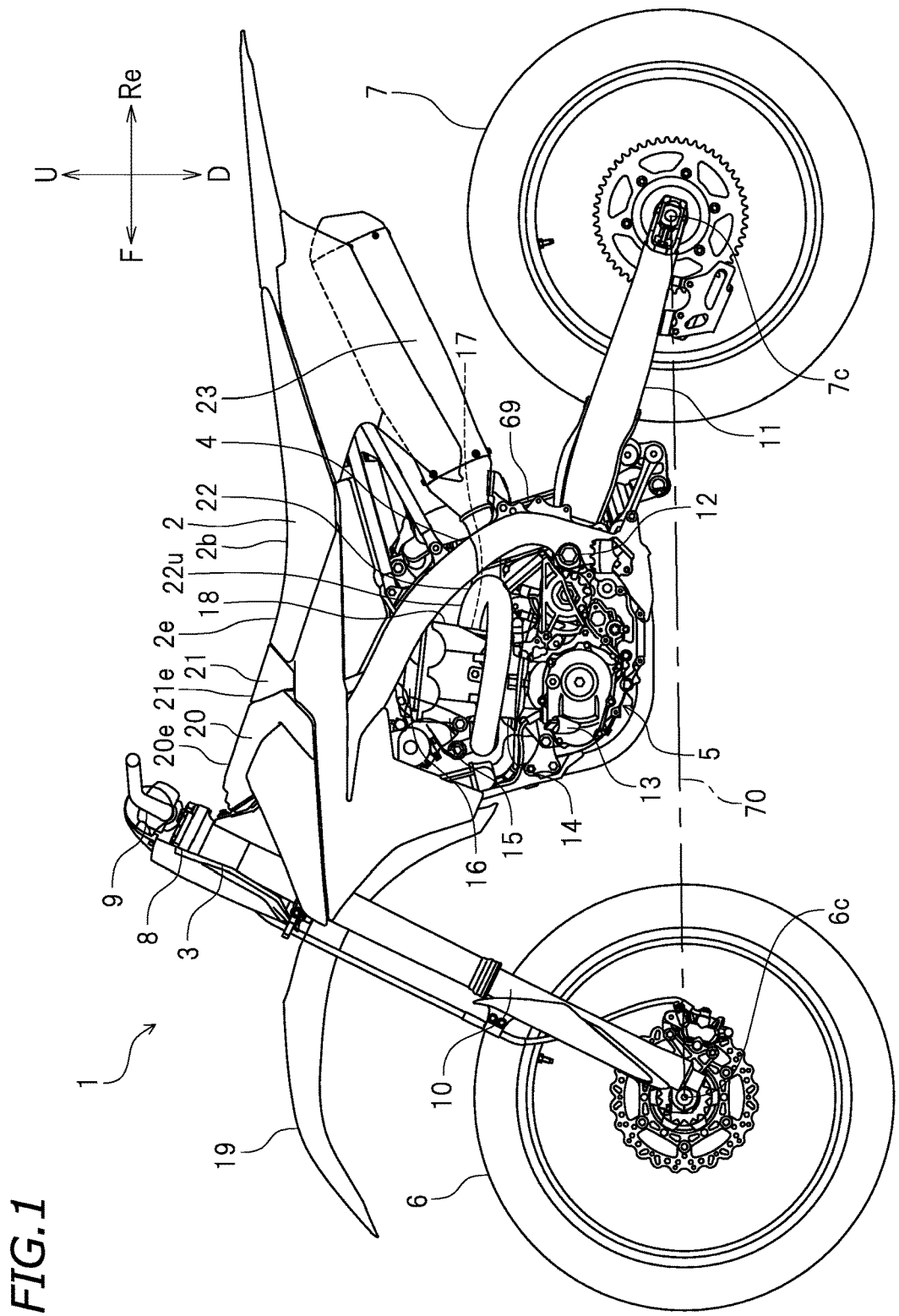
FIG. 1 is a left side view of a motorcycle according to a preferred embodiment of the present invention.
Figure 2:
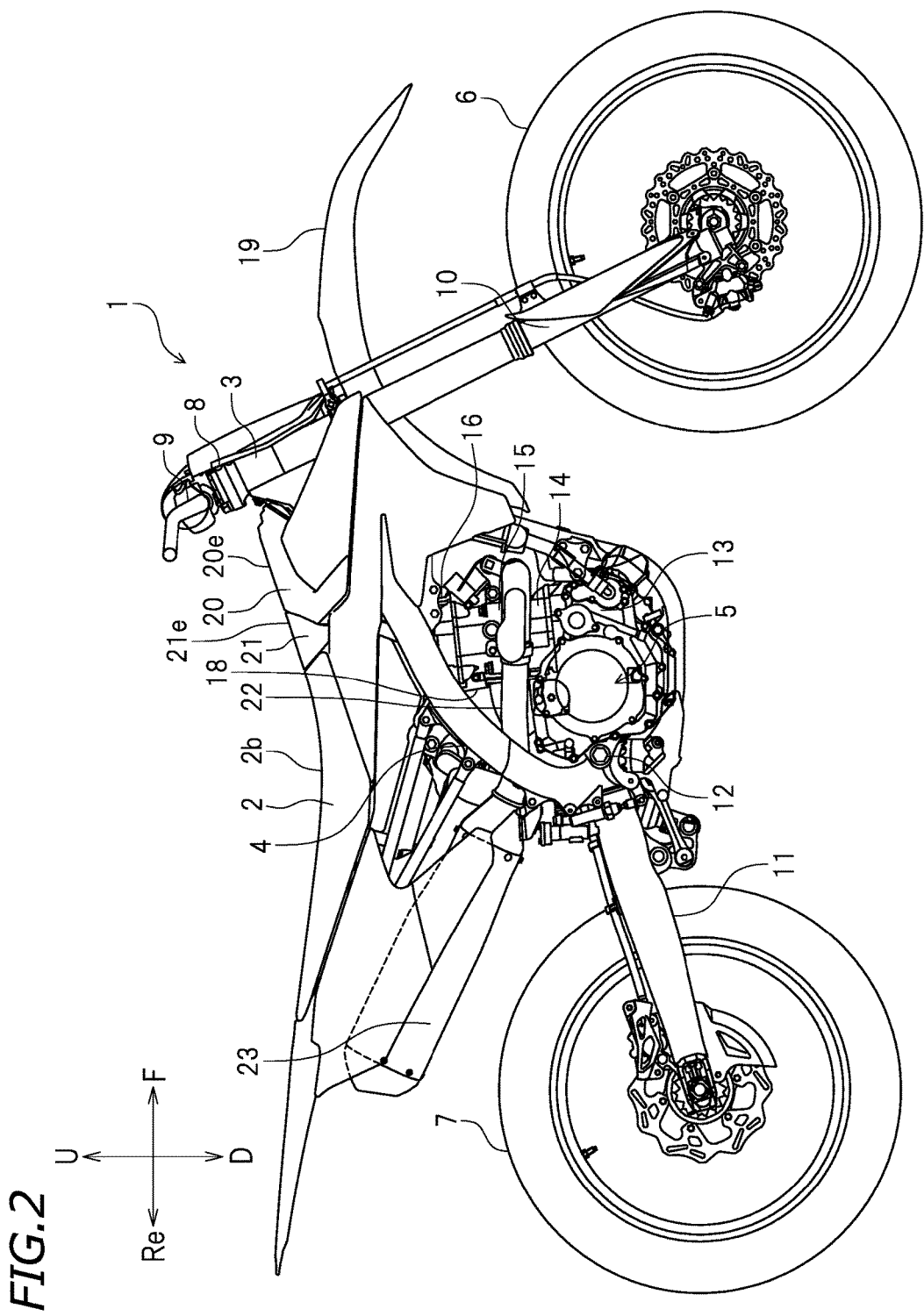
FIG. 2 is a right side view of the motorcycle.

Preferred embodiments of the present invention will now be described with reference to the drawings. As shown in FIG. 1 and FIG. 2, a motorcycle according to a preferred embodiment of the present invention is, for example, an off-road motorcycle 1. Note, however, that the motorcycle of the present invention is not limited to the off-road motorcycle 1, but may be a motorcycle of any other type.

The terms front, rear, left, right, up and down, as used in the description below, refer to these directions as seen from a passenger seated in a seat 2 while the motorcycle 1 is stationary in an upright position on a horizontal surface, unless specified otherwise. The designations F, Re, L, R, U and D, as used in the figures, refer to front, rear, left, right, up and down, respectively. The terms forward and rearward refer to these directions in the vehicle front-rear direction, unless specified otherwise. The terms upward and downward refer to these directions in the vehicle up-down direction. The terms leftward and rightward refer to these directions in the vehicle left-right direction. Note that the vehicle left-right direction is the same as the vehicle width direction.

The motorcycle 1 includes a vehicle body frame 4 including a head pipe 3, a power unit 5 supported on the vehicle body frame 4, a front wheel 6 and a rear wheel 7. A steering shaft 8 is supported on the head pipe 3 so that the steering shaft 8 is able to be rotated left and right. A handle bar 9 is fixed to an upper portion of the steering shaft 8. A front fork 10 is fixed to a lower portion of the steering shaft 8. The front wheel 6 is rotatably supported on the front fork 10. The seat 2 is located rearward of the head pipe 3 and above the power unit 5. A rear arm 11 is attached to the vehicle body frame 4 via a pivot shaft 12. The rear arm 11 is supported on the vehicle body frame 4 so that the rear arm 11 is able to pivot up and down about the pivot shaft 12. The rear wheel 7 is rotatably supported on the rear arm 11. The rear wheel 7 is linked to the power unit 5 via a transmission member such as a chain (not shown). The rear wheel 7 is driven by the power from the power unit 5. A rear cushion unit 69 is located rearward of the power unit 5. The rear cushion unit 69 is located forward of the front end of the rear wheel 7. The upper end of the rear cushion unit 69 is linked to the vehicle body frame 4, and the lower end of the rear cushion unit 69 is linked to the rear arm 11.

An intake box 20 is located rearward of the head pipe 3, and a fuel tank 21 is located rearward of the intake box 20. The seat 2 is located rearward of the fuel tank 21. As the vehicle is seen from the side, an upper edge 20e of the intake box 20, an upper edge 21e of the fuel tank 21 and an upper edge 2e of the seat 2 are located rearward of the head pipe 3, extending in a downward-rearward diagonal direction, and located above a lowermost portion 2b of the upper edge 2e of the seat 2. The motorcycle 1 of the present preferred embodiment is preferably an off-road vehicle, for example, and the minimum ground clearance is therefore set to be relatively high. As shown in FIG. 1, the power unit 5 is located above a straight line 70 extending between the center 6c of the front wheel 6 and the center 7c of the rear wheel 7, as the vehicle is seen from the side. A front fender 19 is located above the front wheel 6. The front fender 19 is located at a relatively high position in order to ensure a sufficient stroke for the front fork 10. Herein, at least a portion of the front fender 19 is located above a cylinder head cover 16 of the power unit 5. A portion of the front fender 19 is located above the lower end of the head pipe 3.

The power unit 5 includes a crankcase 13, a cylinder body 14, a cylinder head 15 and the cylinder head cover 16. The cylinder body 14 is attached to the crankcase 13, and extends in an upward-rearward diagonal direction from the crankcase 13. The cylinder head 15 is attached to the cylinder body 14. The cylinder head 15 includes a rear wall 18 with an exhaust pipe connection port 17 therein. The cylinder head cover 16 is connected to the cylinder head 15.

Figure 3:
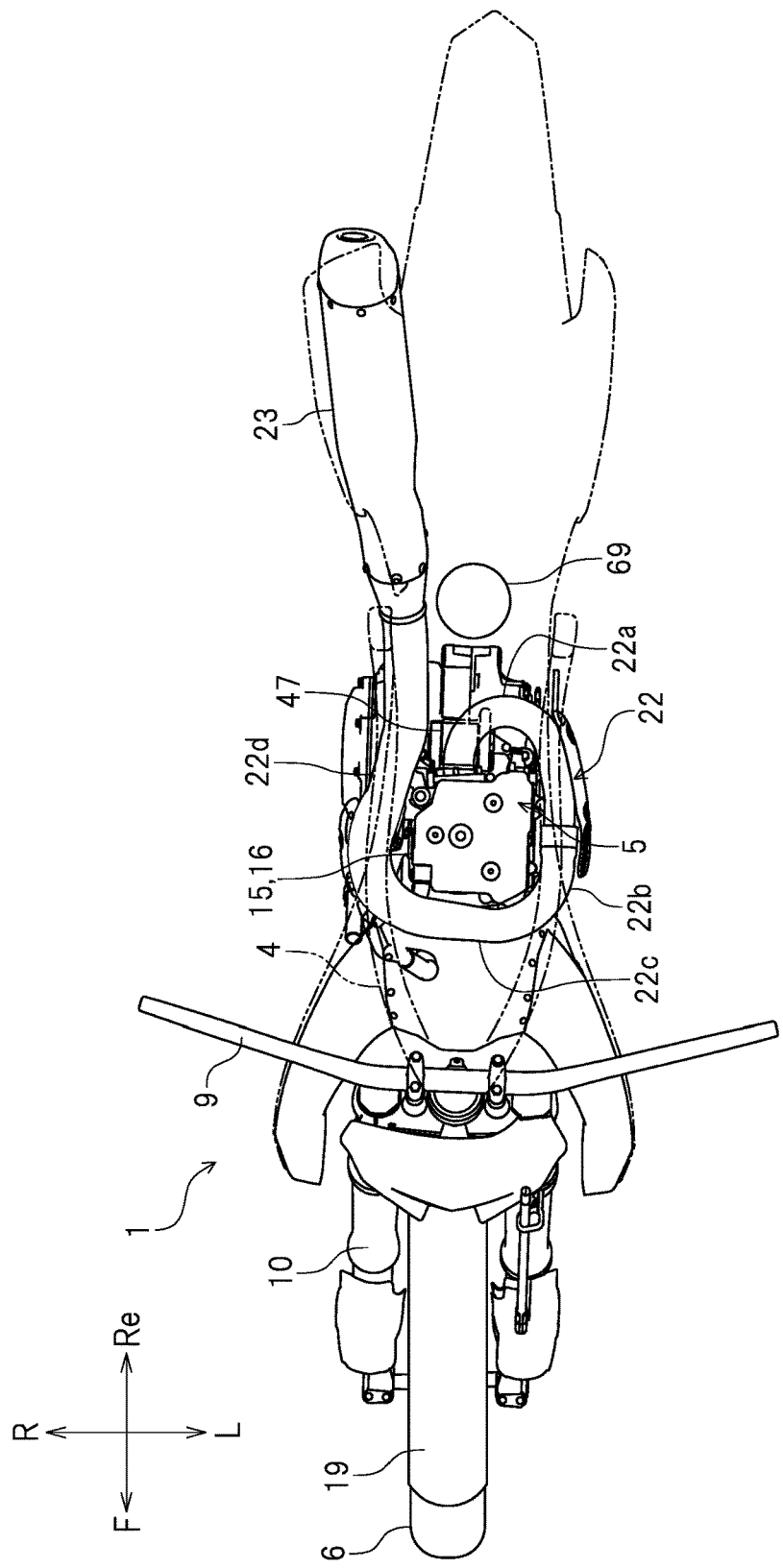
FIG. 3 is a plan view of the motorcycle.

An exhaust pipe 22 is connected to the exhaust pipe connection port 17 of the cylinder head 15. The exhaust pipe 22 includes an upstream portion 22u that is connected to the exhaust pipe connection port 17 and extends in a downward-rearward diagonal direction. As shown in FIG. 3, the exhaust pipe 22 includes a rear portion 22a located rearward of the cylinder head 15, a left portion 22b located leftward of the cylinder head 15, a front portion 22c located forward of the cylinder head 15, and a right portion 22d located rightward of the cylinder head 15, as the vehicle is seen from above. The exhaust pipe 22 preferably extends along the entire circumference of the cylinder head 15, as the vehicle is seen from above. The rear portion 22a is located between the cylinder head 15 and the rear cushion unit 69, as the vehicle is seen from above. A muffler 23 is connected to the downstream end of the exhaust pipe 22.

Figure 4:
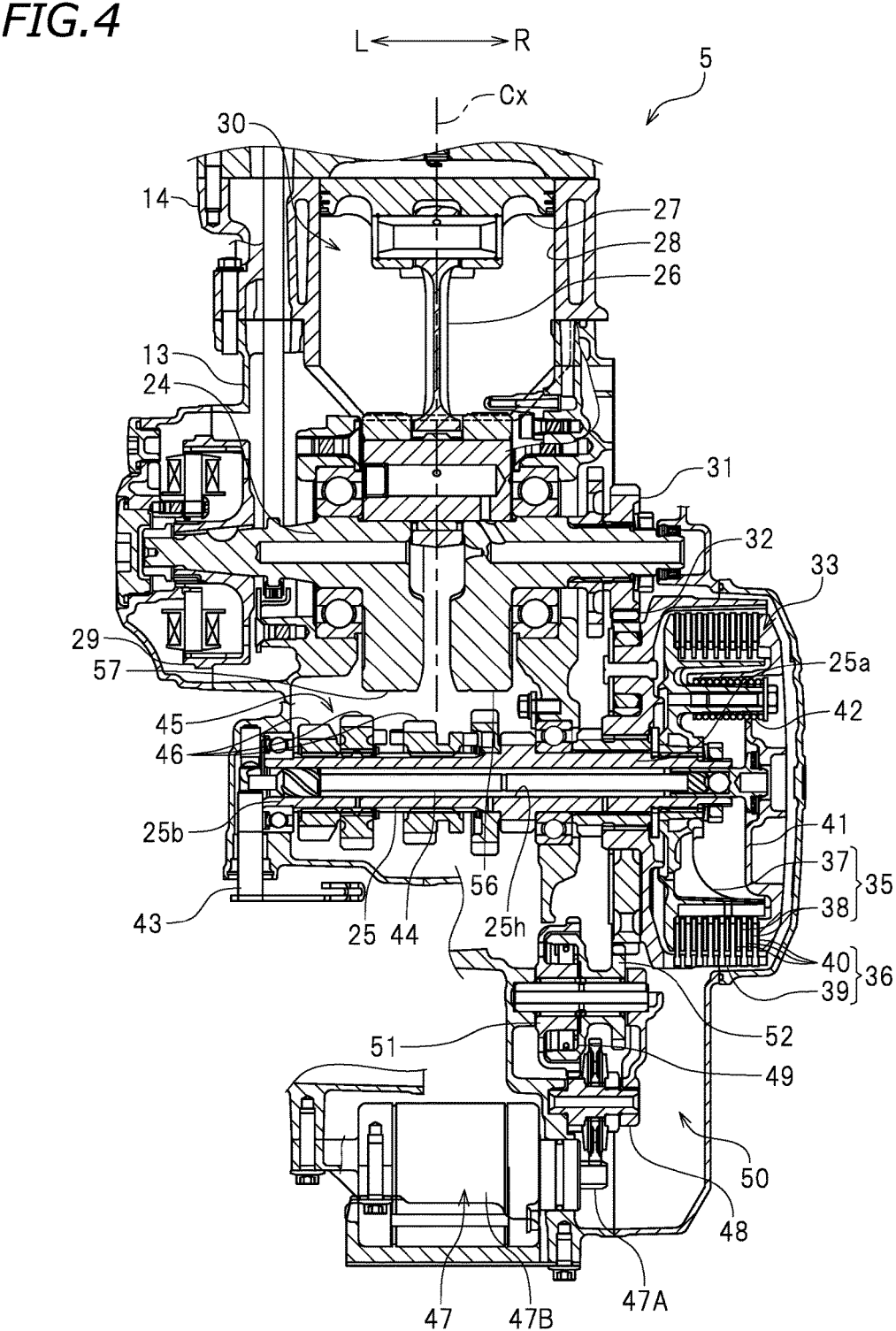
FIG. 4 is a cross-sectional view of a portion of a power unit.

FIG. 4 is a cross-sectional view showing a portion of the power unit 5. As shown in FIG. 4, the power unit 5 includes a crankshaft 24 and a main shaft 25. The crankshaft 24 and the main shaft 25 are accommodated in the crankcase 13 and extend in the vehicle width direction. The main shaft 25 is located rearward of the crankshaft 24.

The power unit 5 preferably includes a single-cylinder internal combustion engine 30. That is, the power unit 5 includes a single cylinder 28. The cylinder body 14 includes the single cylinder 28. Note, however, that the power unit 5 may include a multi-cylinder internal combustion engine. The cylinder body 14 may include a plurality of cylinders 28. The cylinder 28 extends upward while being inclined rearward from the vertical direction.

A piston 27 is located inside the cylinder 28. A connecting rod 26 is linked to the crankshaft 24, and the piston 27 is linked to the connecting rod 26. A generator 29 is provided at the left end of the crankshaft 24. A first gear 31 is provided at the right end of the crankshaft 24.

A clutch 33 is provided at a right end 25a of the main shaft 25. While the clutch 33 of the present preferred embodiment is a multiple-disc clutch, there is no particular limitation on the type of the clutch 33. The clutch 33 includes a first clutch member 35 that is supported on the right end 25a of the main shaft 25 and rotates together with the main shaft 25, and a second clutch member 36 that is supported on the right end 25a of the main shaft 25 and is rotatable relative to the main shaft 25. A second gear 32 that meshes with the first gear 31 of the crankshaft 24 is provided on the second clutch member 36.

In the present preferred embodiment, the first clutch member 35 includes a clutch boss 37 non-rotatably supported on the main shaft 25, and a plurality of drive plates 38 supported on the clutch boss 37. The second clutch member 36 includes a clutch housing 39 rotatably supported on the main shaft 25, and a plurality of driven plates 40 supported on the clutch housing 39. The second gear 32 is provided on the clutch housing 39. The drive plates 38 and the driven plates 40 are located so as to alternate with each other in the axial direction of the main shaft 25. The clutch 33 further includes a pressure plate 41 to press together the drive plates 38 and the driven plates 40, and a spring 42 that urges the pressure plate 41 toward the drive plates 38 and the driven plates 40. In the present preferred embodiment, the pressure plate 41 is located rightward of the drive plates 38 and the driven plates 40. The pressure plate 41 receives a leftward force from the spring 42, and presses the drive plates 38 and the driven plates 40 to the left by the force.

A clutch release lever 43 used to operate the clutch 33 is attached to a left end 25b of the main shaft 25. A hole 25h extending in the axial direction is provided inside the main shaft 25. A pushrod 44 is located inside the hole 25h so that the pushrod 44 is movable in the axial direction. The left end of the pushrod 44 is in engagement with the clutch release lever 43 so that the pushrod 44 moves in the axial direction as the clutch release lever 43 rotates. The right end of the pushrod 44 is in engagement with the pressure plate 41 so that the pressure plate 41 moves in the axial direction together with the pushrod 44. Therefore, when the clutch release lever 43 rotates, the pushrod 44 moves to the right, and the pressure plate 41 is pushed to the right by the pushrod 44. As a result, there is no longer a force by which the pressure plate 41 presses the drive plates 38 and the driven plates 40, thus disengaging the clutch 33. On the other hand, if the clutch release lever 43 rotates in the reverse direction, the pushrod 44 moves to the left, and the pressure plate 41 moves to the left by the force from the spring 42. As a result, the pressure plate 41 presses together the drive plates 38 and the driven plates 40, thus engaging the clutch 33.

A transmission 45 is located inside the crankcase 13. Although not shown in FIG. 4, a drive shaft 53 (see FIG. 7) extending in the vehicle width direction is located inside the crankcase 13. The drive shaft 53 is a shaft that outputs power from the power unit 5. The drive shaft 53 is linked to the rear wheel 7 via a transmission member. The transmission 45 includes a plurality of transmission gears 46 provided on the main shaft 25, and a plurality of transmission gears 54 (see FIG. 7) provided on the drive shaft 53. The transmission gears 46 provided on the main shaft 25 and the transmission gears 54 provided on the drive shaft 53 mesh with each other. Power is transmitted from a transmission gear 46 provided on the main shaft 25 to a transmission gear 54 provided on the drive shaft 53, thus transmitting power from the main shaft 25 to the drive shaft 53 at one of the $1^{st}$ to $n^{th}$ transmission ratios (n is a natural number of 2 or more). The diameters of the transmission gears 46 provided on the main shaft 25 are smaller than the diameter of either the first clutch member 35 or the second clutch member 36. The diameters of the transmission gears 54 provided on the drive shaft 53 are smaller than the diameter of either the first clutch member 35 or the second clutch member 36.

The motorcycle 1 includes a starter motor 47 that starts the internal combustion engine 30. Although there is no particular limitation on the configuration of the starter motor 47, the starter motor 47 of the present preferred embodiment includes a drive shaft 47A extending in the left-right direction and a cylindrical motor casing 47B.

The starter motor 47 is linked to the second gear 32 via one or two or more link gears 50. In the present preferred embodiment, the starter motor 47 is linked to the second gear 32 via a torque limiter 48, a first idler gear 51, a one-way clutch 49 and a second idler gear 52. The torque limiter 48, the first idler gear 51, the one-way clutch 49 and the second idler gear 52 are each an example of the link gear 50. Note, however, that the number and the type of link gears to link together the starter motor 47 and the second gear 32 are not limited to those of the present preferred embodiment, and any change may be made thereto.

The torque limiter 48 is a mechanism that cuts off transmission of an excessive torque. At the start of the internal combustion engine 30, i.e., when the starter motor 47 is actuated, the gas inside the cylinder 28 is compressed as the piston 27 elevates. Then, the gas pressure may become so high that the piston 27 cannot overcome the top dead center, imposing an excessive load on the starter motor 47. An excessive load may be imposed on the starter motor 47 also when the internal combustion engine 30 is in operation. The torque limiter 48 serves to protect the starter motor 47 by preventing an excessive load on the starter motor 47. The torque limiter 48 meshes with the drive shaft 47A of the starter motor 47. Also, the torque limiter 48 meshes with the first idler gear 51. Along the power transmission path, the torque limiter 48 is located between the starter motor 47 and the first idler gear 51.

Figure 5:
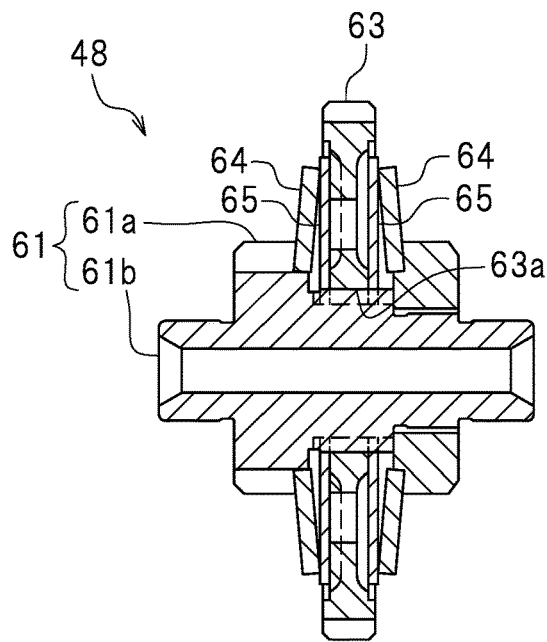
FIG. 5 is a cross-sectional view of a torque limiter.

While there is no particular limitation on the specific configuration of the torque limiter 48, the present preferred embodiment uses the torque limiter 48. As shown in FIG. 5, the torque limiter 48 of the present preferred embodiment includes a metal small gear 61 and a metal large gear 63. The small gear 61 includes a shaft 61b, and teeth 61a provided radially outward of the shaft 61b. The teeth 61a of the small gear 61 mesh with the first idler gear 51. The large gear 63 meshes with the drive shaft 47A of the starter motor 47. A hole 63a is provided at the center of the large gear 63, with the shaft 61b passing through the hole 63a of the large gear 63. The large gear 63 is rotatably supported on the shaft 61b of the small gear 61. A metal friction plate 65 is located on both sides of the large gear 63. The friction plate 65 is in contact with a side surface of the large gear 63. A disc spring 64 is provided between the friction plate 65 and the small gear 61. The disc spring 64 holds the friction plate 65 against the large gear 63. Therefore, there is a static frictional force between the large gear 63 and the friction plate 65. By virtue of this static frictional force, a torque is transmitted from the large gear 63 to the small gear 61. Note, however, that if the torque on the large gear 63 exceeds the static frictional force, the large gear 63 will slip on the friction plate 65. That is, if an excessive torque is applied on the large gear 63, the large gear 63 slips on the friction plate 65, and the large gear 63 rotates with respect to the small gear 61. Thus, the torque transmission is cut off.

Thus, the torque limiter 48 of the present preferred embodiment uses the metal friction plate 65 as a friction material. Therefore, there is no need for an expensive friction material, and the torque limiter 48 is provided at low cost.

Figure 6:
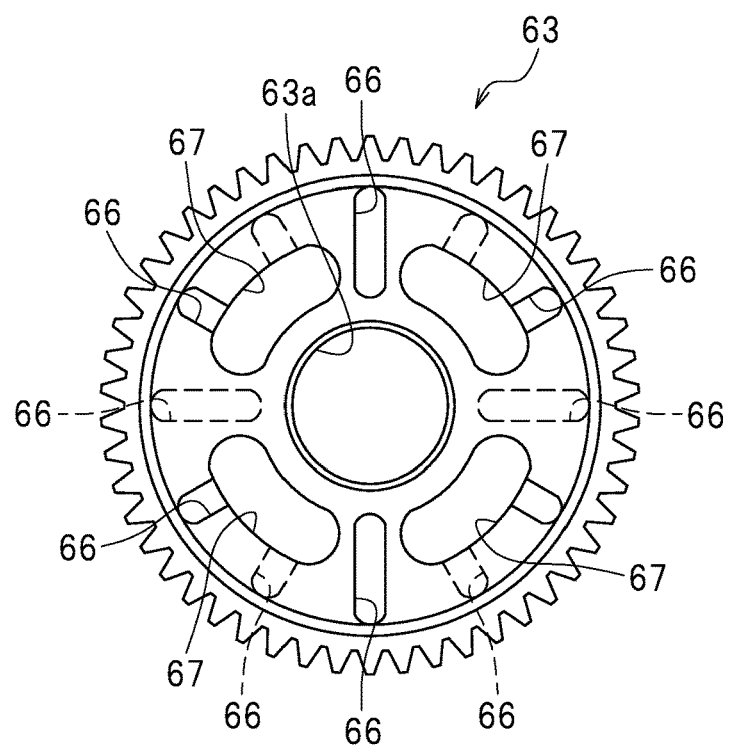
FIG. 6 is a front view of a large gear of the torque limiter.

With the torque limiter 48 of the present preferred embodiment, through holes 67 are provided in the large gear 63, as shown in FIG. 6. This reduces the weight of the large gear 63. A groove 66 is provided on both sides of the large gear 63. Herein, a plurality of grooves 66 are provided on both sides of the large gear 63. Note that there is no particular limitation on the shape and the dimension of the grooves 66. With the provision of the grooves 66 on both sides of the large gear 63, it is possible to improve the lubricity using oil for the large gear 63 slipping on the friction plate 65, and it is also possible to desirably discharge powder particles generated by abrasion. Thus, galling is prevented, and the large gear 63 is allowed to stably slip on the friction plate 65 over a long period of time. Therefore, it is possible to better stabilize the operation while the torque transmission is cut off by the torque limiter 48.

The one-way clutch 49 is a clutch that transmits torque only in one rotation direction. The one-way clutch 49 transmits the drive force from the starter motor 47 toward the second gear 32 but not from the second gear 32 toward the starter motor 47. The one-way clutch 49 is linked to the first idler gear 51. Also, the one-way clutch 49 is linked to the second idler gear 52. Along the power transmission path, the one-way clutch 49 is located between the first idler gear 51 and the second idler gear 52. The one-way clutch 49 transmits the drive force from the first idler gear 51 to the second idler gear 52 but not from the second idler gear 52 to the first idler gear 51. Note that there is no particular limitation on the specific configuration of the one-way clutch 49.

Although the torque limiter 48, the first idler gear 51, the one-way clutch 49 and the second idler gear 52 are located in this order from the starter motor 47 to the second gear 32 in the present preferred embodiment, the order is not limited thereto. There is no particular limitation on the configuration of the first idler gear 51 and the second idler gear 52.

Next, the positional relationships between primary components of the power unit 5 will be described. As shown in FIG. 4, the clutch 33 and the clutch release lever 43 are located on opposite sides of the center line Cx of the cylinder body 14 (note that the center line of the cylinder body 14 coincides with the cylinder axis). In the present preferred embodiment, the clutch 33 is located on the right side of the center line Cx, and the clutch release lever 43 is located on the left side of the center line Cx. Note, however, that the clutch 33 may be located on the left side of the center line Cx, and the clutch release lever 43 may be located on the right side of the center line Cx.

The clutch 33 and the generator 29 are located on opposite sides of the center line Cx. In the present preferred embodiment, the clutch 33 is located on the right side of the center line Cx, and the generator 29 is located on the left side of the center line Cx. Note, however, that the clutch 33 may be located on the left side of the center line Cx, and the generator 29 may be located on the right side of the center line Cx.

The starter motor 47 extends across the center line Cx. The starter motor 47 crosses a vertical plane that includes the center line Cx therein. The starter motor 47 includes a portion located on the left side of the center line Cx and another portion located on the right side of the center line Cx.

The link gear 50 is located on the same side of the center line Cx as the clutch 33. In the present preferred embodiment, the link gear 50 is located on the right side of the center line Cx. That is, the torque limiter 48, the first idler gear 51, the one-way clutch 49 and the second idler gear 52 are located on the right side of the center line Cx.

Figure 7:
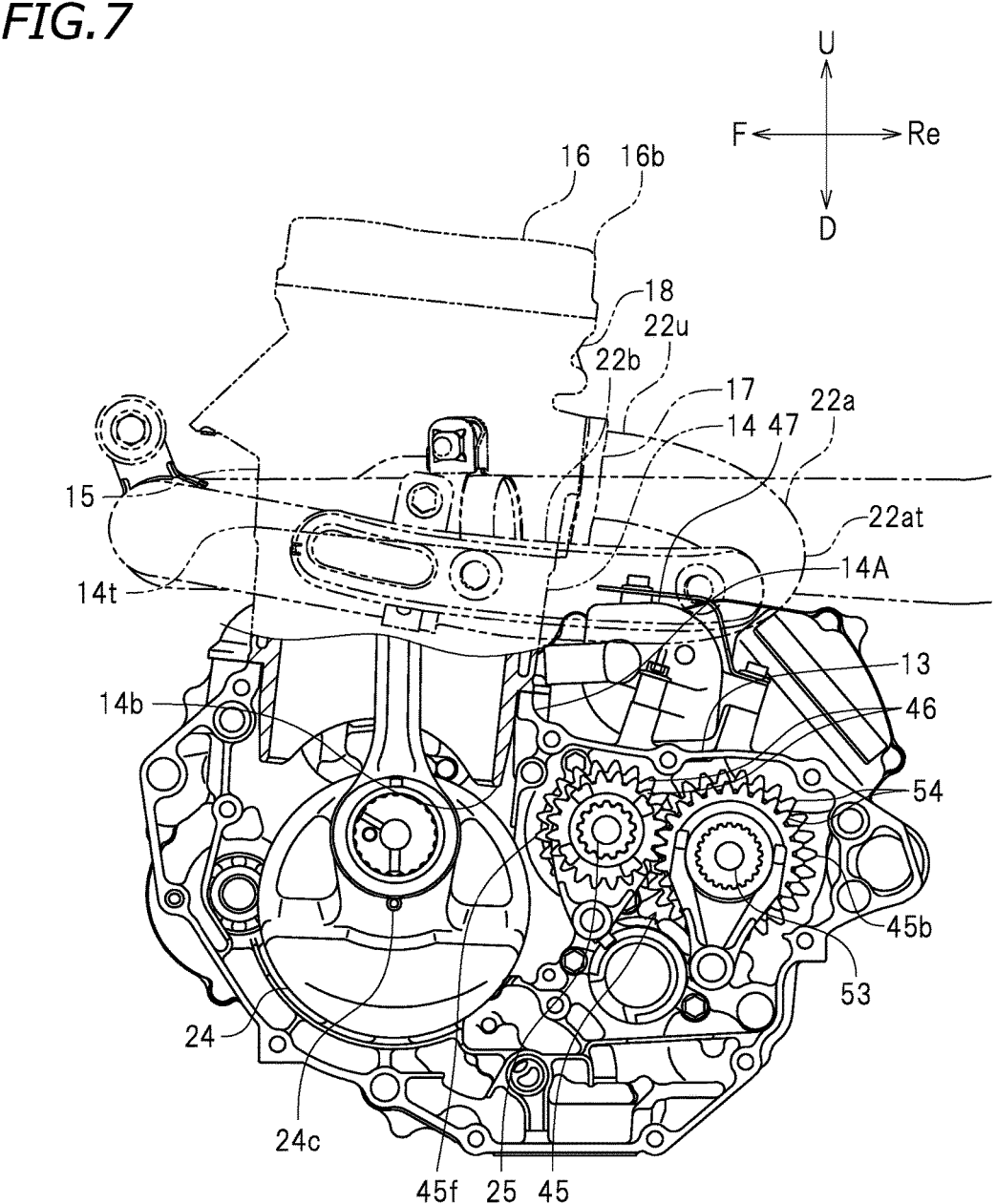
FIG. 7 is a partially-cutaway left side view of the power unit.
Figure 8:
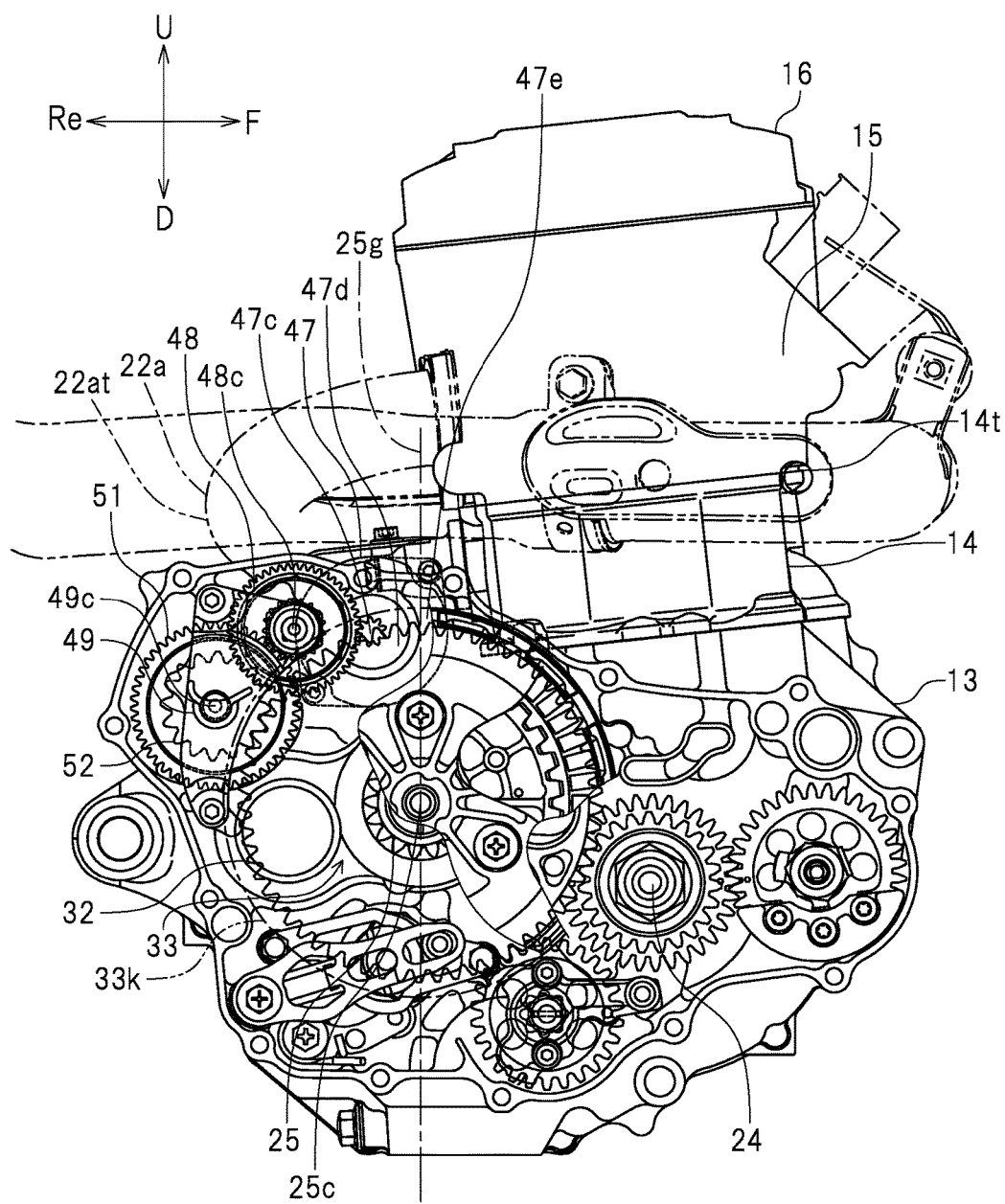
FIG. 8 is a partially-cutaway right side view of the power unit.

FIG. 7 is a cross-sectional view of the power unit 5 as seen from the left side, and FIG. 8 is a cross-sectional view of the power unit 5 as seen from the right side.

As shown in FIG. 7, the starter motor 47 is located rearward and above the center axis 24c of the crankshaft 24. The starter motor 47 is located above the crankcase 13 and rearward of the cylinder body 14. The starter motor 47 is located above the transmission 45. The starter motor 47 is located rearward of a front end 45f of the transmission 45 and forward of a rear end 45b of the transmission 45. The starter motor 47 is located directly above the transmission 45. The starter motor 47 is located in the vicinity of the cylinder body 14. The starter motor 47 is located in the vicinity of an intersection 14A between the crankcase 13 and the cylinder body 14. The starter motor 47 is located so that at least a portion of the starter motor 47 is located forward of a rear end 16b of the cylinder head cover 16. The starter motor 47 is located forward of a rear end 22at of the rear portion 22a of the exhaust pipe 22. The starter motor 47 is located so as to overlap with the left portion 22b of the exhaust pipe 22, as the vehicle is seen from the side. As shown in FIG. 3, the starter motor 47 is located so as to overlap with the rear portion 22a of the exhaust pipe 22, as the vehicle is seen from above.

The starter motor 47 is located above a lower end 14b of the cylinder body 14 and below an upper end 14t of the cylinder body 14. The starter motor 47 is located below the cylinder head 15.

In FIG. 8, reference sign 33k represents the outline of the clutch 33. As the vehicle is seen from the side, the starter motor 47 includes an overlapping portion 47d that overlaps with the clutch 33. Note that the overlapping portion 47d is located within the outline 33k, as the vehicle is seen from the side. In FIG. 8, reference sign 25g represents a vertical line passing through the center axis 25c of the main shaft 25. As the vehicle is seen from the side, the starter motor 47 includes a front portion 47e located forward of the center axis 25c of the main shaft 25.

As shown in FIG. 8, a center 48c of the torque limiter 48 is located rearward of the center 47c of the starter motor 47, as the vehicle is seen from the side. The center 48c of the torque limiter 48 is located forward and above the center 49c of the one-way clutch 49, as the vehicle is seen from the side. The center 48c of the torque limiter 48 is located rearward and above the center axis 25c of the main shaft 25. The center 48c of the torque limiter 48 is located above the lower end 14b of the cylinder body 14 (see FIG. 7) and below the upper end 14t of the cylinder body 14. The center 48c of the torque limiter 48 is located forward of the rear end 22at of the rear portion 22a of the exhaust pipe 22.

As shown in FIG. 8, the center 49c of the one-way clutch 49 is located rearward and below of the center 47c of the starter motor 47, as the vehicle is seen from the side. The center 49c of the one-way clutch 49 is located rearward and above the center axis 25c of the main shaft 25. A portion of the one-way clutch 49 is located forward of the rear end 22at of the rear portion 22a of the exhaust pipe 22. Another portion of the one-way clutch 49 is located rearward of the rear end 22at of the rear portion 22a of the exhaust pipe 22.

The motorcycle 1 is preferably configured as described above. Next, advantageous effects realized by the motorcycle 1 of the present preferred embodiment will be described.

With the motorcycle 1 of the present preferred embodiment, the starter motor 47 is linked to the second gear 32 of the clutch 33 via the link gear 50, as shown in FIG. 4. Therefore, there is no need to provide the main shaft 25 with a starting gear linked to the starter motor 47 separately from the second gear 32 linked to the first gear 31 of the crankshaft 24. There is also no need to provide the crankshaft 24 with a starting gear linked to the starter motor 47 separately from the first gear 31. Therefore, it is possible to prevent an increase in the dimension in the axial direction of the main shaft 25 and prevent an increase in the dimension in the axial direction of the crankshaft 24, while the starter motor 47 is located at a position above the crankcase 13 and rearward of the cylinder body 14. The protrusion of the clutch 33 and the generator 29 on the side of the power unit 5 is significantly reduced or prevented. Therefore, with the motorcycle 1 of the present preferred embodiment, it is possible to prevent an increase in size of the power unit 5.

Note that in the case of the single-cylinder internal combustion engine 30 including the single cylinder 28, the dimension in the axial direction of the crankshaft 24 is small in the first place, and the dimension in the vehicle width direction of the power unit 5 is small in the first place. Therefore, the advantageous effect mentioned above is even more pronounced.

The diameters of the transmission gears 46 of the transmission 45 are smaller than the diameters of the first clutch member 35 and the second clutch member 36 of the clutch 33. As can be seen from a comparison between FIG. 7 and FIG. 8, there is more spare space above the transmission 45 than there is above the clutch 33. With the motorcycle 1 of the present preferred embodiment, since the starter motor 47 is located above the transmission 45, the starter motor 47 is able to be located above the crankcase 13 and rearward of the cylinder body 14 without interfering with the exhaust pipe 22. According to the present preferred embodiment, the starter motor 47 does not need to be installed at a position far away from the exhaust pipe 22. Therefore, with the motorcycle 1 of the present preferred embodiment, as shown in FIG. 8, the starter motor 47 is located in the vicinity of the intersection 14A between the crankcase 13 and the cylinder body 14 (see FIG. 7) such that the starter motor 47 includes the overlapping portion 47d overlapping with the clutch 33 and the front portion 47e located forward of the center axis 25c of the main shaft 25, as the vehicle is seen from the side. Thus, it is possible to prevent an increase in size of the power unit 5. As the starter motor 47 is successfully located in the vicinity of the intersection 14A, it is possible to achieve mass centralization.

Moreover, with the motorcycle 1 of the present preferred embodiment, as the starter motor 47 is located in the vicinity of the intersection 14A, it is possible to prevent an increase in size of the link gear 50. This also makes it possible to prevent an increase in size of the power unit 5.

As described above, with the motorcycle 1 of the present preferred embodiment, it is possible to achieve mass centralization and prevent an increase in size of the power unit 5.

With the motorcycle 1 of the present preferred embodiment, the link gear 50 includes the one-way clutch 49. Therefore, it is possible to prevent an excessive torque from being input to the starter motor 47, thus protecting the starter motor 47, while achieving mass centralization and preventing an increase in size of the power unit 5.

As shown in FIG. 8, the center 49c of the one-way clutch 49 is located rearward and below the center 47c of the starter motor 47, as the vehicle is seen from the side. Therefore, even with the provision of the one-way clutch 49, it is possible to achieve mass centralization and prevent an increase in size of the power unit 5 in the vehicle up-down direction.

With the motorcycle 1 of the present preferred embodiment, the link gear 50 includes the torque limiter 48. Therefore, at the start and while running, it is possible to prevent an excessive torque from being input to the starter motor 47, thus protecting the starter motor 47.

As shown in FIG. 8, the center 48c of the torque limiter 48 is located rearward of the center 47c of the starter motor 47 and located forward and above the center 49c of the one-way clutch 49, as the vehicle is seen from the side. Then, it is possible to achieve mass centralization and prevent an increase in size of the power unit 5.

With the motorcycle 1 of the present preferred embodiment, as shown in FIG. 4, the starter motor 47 meshes with the torque limiter 48, the torque limiter 48 meshes with the one-way clutch 49 via the first idler gear 51, and the one-way clutch 49 meshes with the second gear 32 of the clutch 33 via the second idler gear 52. Along the power transmission path extending from the starter motor 47 to the second gear 32, the torque limiter 48 and the one-way clutch 49 are located in this order. With such an arrangement, it is possible to achieve the motorcycle 1 with which it is possible to achieve mass centralization and prevent an increase in size of the power unit 5. When power is transmitted from the torque limiter 48 to the one-way clutch 49, the rotation speed is decelerated. When power is transmitted from the one-way clutch 49 to the second gear 32, the rotation speed is decelerated. The torque received by the torque limiter 48 is smaller than the torque received by the one-way clutch 49. Therefore, the torque limiter 48 is small. Moreover, an inexpensive torque limiter 48 is able to be used.

With the motorcycle 1 of the present preferred embodiment, as shown in FIG. 4, the clutch 33 is supported on the right end 25a of the main shaft 25, and the clutch release lever 43 is supported on the left end 25b of the main shaft 25. The link gear 50 is located on the right side of the center line Cx of the cylinder body 14. Therefore, it is possible to easily avoid interference between the starter motor 47 and the clutch release lever 43. Thus, the starter motor 47 is installed at the position described above without increasing the size of the power unit 5.

With the motorcycle 1 of the present preferred embodiment, as shown in FIG. 4, the starter motor 47 crosses a vertical plane that includes the center line Cx of the cylinder body 14 therein. Thus, as the starter motor 47 is located relatively close to the center, the protruding amount of the power unit 5 in the vehicle width direction is significantly reduced or prevented. Therefore, it is possible to prevent an increase in size of the power unit 5.

With the motorcycle 1 of the present preferred embodiment, as shown in FIG. 3, the exhaust pipe 22 includes the rear portion 22a located rearward of the cylinder head 15, the left portion 22b located leftward of the cylinder head 15, the front portion 22c located forward of the cylinder head 15, and the right portion 22d located rightward of the cylinder head 15, as the vehicle is seen from above. With the motorcycle 1 of the present preferred embodiment, it is possible to avoid interference between the exhaust pipe 22 and the starter motor 47 even though the exhaust pipe 22 extends along the entire circumference of the cylinder head 15, as the vehicle is seen from above. Therefore, it is possible to achieve a compact arrangement of the exhaust pipe 22 while ensuring a sufficient length of the exhaust pipe 22. Thus, the power unit 5 is small while achieving mass centralization.

While preferred embodiments of the present invention have been described above, it is understood that the present invention is not limited to the preferred embodiments described above and can be carried out in various other preferred embodiments.

While the clutch 33 and the link gear 50 are preferably located on the right side of the center line Cx of the cylinder body 14 and the generator 29 is preferably located on the left side of the center line Cx in the preferred embodiment described above, the arrangement of these members may be reversed. That is, the clutch 33 and the link gear 50 may be located on the left side of the center line Cx and the generator 29 may be located on the right side of the center line Cx.

While the internal combustion engine 30 described above is preferably a single-cylinder internal combustion engine including only one cylinder 28, the internal combustion engine 30 may be a multi-cylinder internal combustion engine including a plurality of cylinders 28. For example, the internal combustion engine 30 may be a multi-cylinder internal combustion engine, in which a plurality of cylinders 28 are arranged next to each other in the vehicle width direction.

While the exhaust pipe 22 preferably extends along the entire circumference of the cylinder head 15, as the vehicle is seen from above, in the preferred embodiments described above, the exhaust pipe 22 is not limited to such a configuration. Any of various configurations known in the art may be used for the exhaust pipe 22.

While the torque limiter 48 is preferably located between the starter motor 47 and the one-way clutch 49 along the power transmission path extending from the starter motor 47 to the second gear 32 in the preferred embodiments described above, the one-way clutch 49 may be located between the starter motor 47 and the torque limiter 48.

While the starter motor 47 preferably crosses a vertical plane that includes the center line Cx of the cylinder body 14 therein in the preferred embodiments described above, the starter motor 47 may be located so as not to cross the vertical plane. The starter motor 47 may be located on the same side of the vertical plane as the second gear 32 (the right side in the preferred embodiments described above).

The motorcycle 1 may include a kick pedal linked to the crankshaft 24, separately from the starter motor 47. That is, the motorcycle 1 may be configured so that a passenger can start the internal combustion engine 30 by operating a kick pedal, as well as starting the internal combustion engine 30 by the starter motor 47.

The terms and expressions used herein are used for explanation purposes and should not be construed as being restrictive. It should be appreciated that the terms and expressions used herein do not eliminate any equivalents of features illustrated and mentioned herein, but include various modifications falling within the claimed scope of the present invention. The present invention may be embodied in many different forms. The present disclosure is to be considered as providing examples of the preferred embodiments of the present invention. These examples are described herein with the understanding that such examples are not intended to limit the present invention to the preferred embodiments described herein and/or illustrated herein. Hence, the present invention is not limited to the preferred embodiments described herein. The present invention includes any and all preferred embodiments including equivalent elements, modifications, omissions, combinations, adaptations and/or alterations as would be appreciated by those skilled in the art on the basis of the present disclosure. The limitations in the claims are to be interpreted broadly based on the language included in the claims and not limited to examples described in the present specification or during the prosecution of the application.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A motorcycle comprising:
a crankcase;
a crankshaft accommodated in the crankcase and extending in a vehicle width direction;
a main shaft accommodated in the crankcase, extending in the vehicle width direction, and located rearward of the crankshaft;
a clutch including a first clutch member that is supported on the main shaft, rotates together with the main shaft, and includes a plurality of drive plates, and a second clutch member that is supported on the main shaft, is rotatable relative to the main shaft, and includes a plurality of driven plates;
a first gear provided on the crankshaft;
a second gear provided on the second clutch member and that meshes with the first gear;
a transmission including a plurality of transmission gears provided on the main shaft, diameters of the transmission gears being smaller than a diameter of either the first clutch member or the second clutch member, and a transmission ratio of the transmission is changeable from $1^{st}$ to $n^{th}$ transmission ratios, where n is a natural number of 2 or more;
a cylinder body attached to the crankcase and extending in an upward-rearward diagonal direction from the crankcase;
a cylinder head attached to the cylinder body and including a rear wall with an exhaust pipe connection port;
an exhaust pipe connected to the exhaust pipe connection port of the cylinder head, the exhaust pipe including an upstream portion extending in a downward-rearward diagonal direction;
a starter motor located above the crankcase and rearward of the cylinder body; and
a link gear that links together the second gear and the starter motor; wherein
the starter motor is located above the transmission; and
the starter motor includes an overlapping portion that overlaps with the clutch, as the vehicle is seen from a side, and a front portion located forward of a center axis of the main shaft, as the vehicle is seen from the side.

2. The motorcycle according to claim 1, wherein the link gear includes a one-way clutch that transmits power from the starter motor to the second gear and that cuts off power from the second gear to the starter motor.

3. The motorcycle according to claim 2, wherein a center of the one-way clutch is located rearward and below a center of the starter motor, as the vehicle is seen from the side.

4. The motorcycle according to claim 2, wherein the link gear includes a torque limiter.

5. The motorcycle according to claim 4, wherein a center of the torque limiter is located rearward of a center of the starter motor and located forward and above a center of the one-way clutch, as the vehicle is seen from the side.

6. The motorcycle according to claim 4, wherein
the starter motor meshes with the torque limiter;
the torque limiter meshes with the one-way clutch via a first idler gear; and the one-way clutch meshes with the second gear via a second idler gear.

7. The motorcycle according to claim 1, wherein the main shaft includes a first end and a second end;

the first clutch member and the second clutch member are supported on the first end of the main shaft;

the motorcycle further comprises a clutch release lever attached to the second end of the main shaft and used to operate the clutch; and the link gear is located on a same side of a center line of the cylinder body as the first end of the main shaft.

8. The motorcycle according to claim 1, wherein the starter motor extends across a vertical plane that includes a center line of the cylinder body.

9. The motorcycle according to claim 1, wherein the exhaust pipe includes a rear portion located rearward of the cylinder head, a left portion located leftward of the cylinder head, a front portion located forward of the cylinder head, and a right portion located rightward of the cylinder head, as the vehicle is seen from above.

10. The motorcycle according to claim 1, wherein the cylinder body includes a single cylinder.

\* \* \* \* \*